(12) United States Patent
Beard et al.

(10) Patent No.: US 10,375,359 B1
(45) Date of Patent: Aug. 6, 2019

(54) VISUALLY INTELLIGENT CAMERA DEVICE WITH PERIPHERAL CONTROL OUTPUTS

(71) Applicant: Trace Live Network Inc., Calgary (CA)

(72) Inventors: Paul Beard, Bigfork, MT (US); Craig McDermott, Cedar Rapids, IA (US)

(73) Assignee: Trace Live Network Inc., Calgary (CA)

( * ) Notice: Subject to any disclaimer, the term of this patent is extended or adjusted under 35 U.S.C. 154(b) by 397 days.

(21) Appl. No.: 14/939,369

(22) Filed: Nov. 12, 2015

Related U.S. Application Data (60) Provisional application No. 62/078,606, filed on Nov. 12, 2014.

(51) Int. Cl.
| | | |
|---|---|---|
| *H04N 7/18* | (2006.01) | |
| *B64C 39/02* | (2006.01) | |
| *G05D 1/10* | (2006.01) | |
| *G05D 1/02* | (2006.01) | |
| *H04N 5/225* | (2006.01) | |
| *G06T 7/20* | (2017.01) | |
| *G06T 7/00* | (2017.01) | |

(52) U.S. Cl.
CPC ........... *H04N 7/181* (2013.01); *B64C 39/024* (2013.01); *G05D 1/0246* (2013.01); *G05D 1/102* (2013.01); *G06T 7/0044* (2013.01); *G06T 7/204* (2013.01); *H04N 5/2252* (2013.01); *B64C 2201/108* (2013.01); *B64C 2201/123* (2013.01); *G06T 2207/30241* (2013.01); *G06T 2207/30252* (2013.01)

(58) Field of Classification Search
CPC .... H04N 7/181; H04N 5/2252; B64C 39/024; G05D 1/0246; G05D 1/102; G06T 7/0044; G06T 7/204
See application file for complete search history.

(56) References Cited

U.S. PATENT DOCUMENTS

| | | | |
|---|---|---|---|
| 2009/0134273 A1* | 5/2009 | Page | B64C 39/024 244/63 |
| 2010/0017046 A1* | 1/2010 | Cheung | G01S 7/003 701/2 |
| 2010/0042269 A1* | 2/2010 | Kokkeby | G01S 3/7864 701/3 |
| 2014/0061376 A1* | 3/2014 | Fisher | B60K 1/00 244/62 |
| 2014/0151508 A1* | 6/2014 | Szuminski | B60V 1/00 244/137.1 |

* cited by examiner

*Primary Examiner* — Christopher G Findley
(74) *Attorney, Agent, or Firm* — Suiter Swantz pc llo (57) ABSTRACT

A system and related method for tracking a moving subject via a ground-based or airborne peripheral device includes plugging an intelligent camera device to the unmanned vehicle, establishing a peripheral link by which the intelligent camera device can assume control of the unmanned vehicle's control systems. Based on analysis of images captured by the intelligent camera device, in addition to position data associated with the unmanned vehicle or with the subject, the intelligent camera device may autonomously maneuver the unmanned vehicle to track or follow the subject while maintaining the moving subject in a consistent framing orientation.

16 Claims, 5 Drawing Sheets

VISUALLY INTELLIGENT CAMERA DEVICE WITH PERIPHERAL CONTROL OUTPUTS

CROSS-REFERENCE TO RELATED APPLICATIONS

This application claims priority under 35 U.S.C. § 119(e) to provisional U.S. Patent Application Ser. No. 62/078,606 filed on Nov. 12, 2014. This application is related to U.S. patent application Ser. No. 14/533,995, filed on Nov. 5, 2014; Ser. No. 14/642,370 filed on Mar. 9, 2015; Ser. No. 14/802,871 filed on Jul. 17, 2015; Ser. No. 14/825,878 filed on Aug. 13, 2015; Ser. No. 14/825,956 filed on Aug. 13, 2015; and Ser. No. 14/863,917. Said U.S. Patent Application 62/078,606, Ser. Nos. 14/553,995, 14/642,370, 14/802,871, 14/825,878, 14/825,956, and 14/863,917 are herein incorporated by reference in their entirety.

BACKGROUND

The above-incorporated U.S. Patent Applications disclose various methods and systems for configuring a camera or image sensor to capture a series of images which are then analyzed to determine position information of a subject individual portrayed by the images. For example, by tracking the movement of the portrayed subject relative to the frame, or relative to other objects portrayed by the images, the movement or position of the subject may be interpolated, and the camera (incorporated into a mobile platform, such as an unmanned aerial vehicle or UAV) maneuvered to keep the moving subject consistently framed. However, the above-incorporated systems must be individually custom-built into a UAV, for example, of a fixed size. It may therefore be desirable for such a visually intelligent camera to have a degree of modularity allowing on-the-fly customization with a variety of airborne or ground-based multiple platforms useful for a broad variety of visual tracking scenarios. It may be desirable for such a modular intelligent camera system to be removably couplable (or pluggable into) a mobile platform such as an unmanned air or ground vehicle capable of being controlled or steered, and thereby following a subject, by tracking the movements of the subject via onboard cameras or image sensors. It may additionally be desirable for such a mobile platform to augment its subject tracking capabilities by receiving and analyzing position data.

SUMMARY

In one aspect, embodiments of the inventive concepts disclosed herein are directed to an intelligent camera system capable of tracking a subject based on visual recognition of captured images or position data. The system may comprise a housing, a camera or image sensor situated at least partially within the housing, a processor operatively coupled to the image sensor, and a memory operatively coupled to the processor.

The housing of the system may be removably connectable to at least one peripheral device by a peripheral port. The image sensor may be configured to capture one or more images which may be associated with the subject. The processor may be configured to select a subject to track or follow based on one or more of a captured image associated with the subject and position data collected by a position sensor. The processor may be configured to establish a data link to the peripheral device via the peripheral port. The processor may be configured to identify, and take control of, a control system of the peripheral device via the data link. The processor may be configured to generate one or more peripheral instructions based on the captured image or position data, and to adjust the position, velocity, or heading of the peripheral device (i.e., control or steer the peripheral device) by forwarding the peripheral instructions to the control systems of the peripheral device via the data link.

In a further aspect, embodiments of the inventive concepts disclosed herein are directed to an intelligent camera system further including a wireless transceiver configured to establish a wireless link to a smartphone or mobile communications device.

In a further aspect, embodiments of the inventive concepts disclosed herein are directed to an intelligent camera system wherein the processor is further configured to receive position data from one or more position sensors of the mobile communications device, or from one or more position sensors of the peripheral device.

In a further aspect, embodiments of the inventive concepts disclosed herein are directed to an intelligent camera system wherein the position sensors include a GNSS receiver, an accelerometer, a compass, and a magnetometer.

In a further aspect, embodiments of the inventive concepts disclosed herein are directed to an intelligent camera system wherein the smartphone or mobile communications device is carried by the subject.

In a further aspect, embodiments of the inventive concepts disclosed herein are directed to an intelligent camera system wherein the processor is configured to determine a position, a velocity, or a heading of the subject based on the captured image and received position data.

In a further aspect, embodiments of the inventive concepts disclosed herein are directed to an intelligent camera system wherein the processor is configured to interpolate a future position of the subject based on the captured image and received position data.

In a further aspect, embodiments of the inventive concepts disclosed herein are directed to an intelligent camera system wherein the processor is configured to determine the position, the velocity, or the heading of the subject by comparing the captured image to a reference image associated with the subject.

In a further aspect, embodiments of the inventive concepts disclosed herein are directed to an intelligent camera system wherein the peripheral device includes an unmanned aerial vehicle (UAV) having rotors configured to rotate at a rotor speed, the rotors articulated by motors coupled to the control system of the peripheral device. The peripheral instructions may include adjusting a position, altitude, rotational orientation, heading, or velocity of the UAV by adjusting one or more rotor speeds.

In a further aspect, embodiments of the inventive concepts disclosed herein are directed to an intelligent camera system wherein the peripheral device includes an unmanned ground vehicle (UGV).

In a further aspect, embodiments of the inventive concepts disclosed herein are directed to a method for tracking a subject via a peripheral device. The method may comprise establishing a data link by removably attaching an apparatus to the peripheral device, the apparatus including an image sensor and a processor operatively coupled to the image sensor. The method may identify a control system of the peripheral device via the processor, and configure the control system to receive peripheral instructions from the processor. The method may capture one or more images associated with the subject via the processor. The method may determine, via the processor, a position, heading, or velocity of the subject based on the captured image. The method may generate the peripheral instructions via the processor based on the determined position, heading, or velocity of the subject. The method may adjust a location, heading, velocity or orientation of the peripheral device by forwarding the peripheral instructions to the control system.

In a further aspect, embodiments of the inventive concepts disclosed herein are directed to a method wherein the peripheral device further includes an unmanned aerial vehicle (UAV) or an unmanned ground vehicle (UGV).

In a further aspect, embodiments of the inventive concepts disclosed herein are directed to a method wherein the UAV includes one or more rotors configured to rotate at a rotor speed, the rotors articulated by motors coupled to the control system. The method may adjust the location, heading, velocity, or orientation of the UAV by forwarding the peripheral instructions to the control system to adjust the one or more rotor speeds.

In a further aspect, embodiments of the inventive concepts disclosed herein are directed to a method further including receiving, via the processor, position data from a position sensor of the peripheral device via the data link.

In a further aspect, embodiments of the inventive concepts disclosed herein are directed to a method further including determining the position, heading, or velocity of the subject based on the captured image and the received position data.

In a further aspect, embodiments of the inventive concepts disclosed herein are directed to a method further including establishing a wireless link to a smartphone or other mobile communication device. The method may receive position data from a position sensor of the mobile communication device via the wireless link.

In a further aspect, embodiments of the inventive concepts disclosed herein are directed to a method further including determining, via the processor, the position, heading, or velocity of the subject based on the captured image and the position data received via the wireless link.

In a further aspect, embodiments of the inventive concepts disclosed herein are directed to a method further including determining, via the processor, the position, heading, or velocity of the subject by comparing the captured image to a reference image associated with the subject.

In a further aspect, embodiments of the inventive concepts disclosed herein are directed to a method further including determining, via the processor, a future position of the subject based on the captured image. The method may generate the peripheral instructions based on the determined future position.

It is to be understood that both the foregoing general description and the following detailed description are exemplary and explanatory only and are not necessarily restrictive of the inventive concepts disclosed herein as claimed. The accompanying drawings, which are incorporated in and constitute a part of the specification, illustrate embodiments of the inventive concepts disclosed herein and together with the general description, serve to explain the principles of the inventive concepts.

BRIEF DESCRIPTION OF THE FIGURES

The inventive concepts disclosed herein may be better understood by those skilled in the art by reference to the accompanying figures in which.

DETAILED DESCRIPTION

Features of the inventive concepts disclosed herein in their various embodiments are exemplified by the following descriptions with reference to the accompanying drawings, which describe the inventive concepts with further detail. It is to be understood that both the foregoing general description and the following detailed description are exemplary and explanatory only and are not necessarily restrictive of the inventive concepts disclosed and claimed herein. These drawings depict only exemplary embodiments of the inventive concepts, and should not be considered to limit their scope in any way.

Embodiments of the inventive concepts herein are directed to a system and related method for selecting and following a subject via an intelligent camera coupled to a mobile platform such as an unmanned aerial vehicle (UAV) or an unmanned ground vehicle (UGV). The intelligent camera system may be coupled to the mobile platform, whereby the system processor identifies and links to control systems of the mobile platform. Based on captured images of the subject and position data associated with the subject or with the mobile platform itself, the system may interpolate the position, heading, or velocity of the subject and issue peripheral commands to the control system of the mobile platform, thereby maneuvering the mobile platform to maintain the subject in frame. The intelligent camera system may be programmed to maneuver the mobile platform according to environmental information collected while following one or more subjects through a known environment, or according to preprogrammed maneuvers.

Figure 1A:
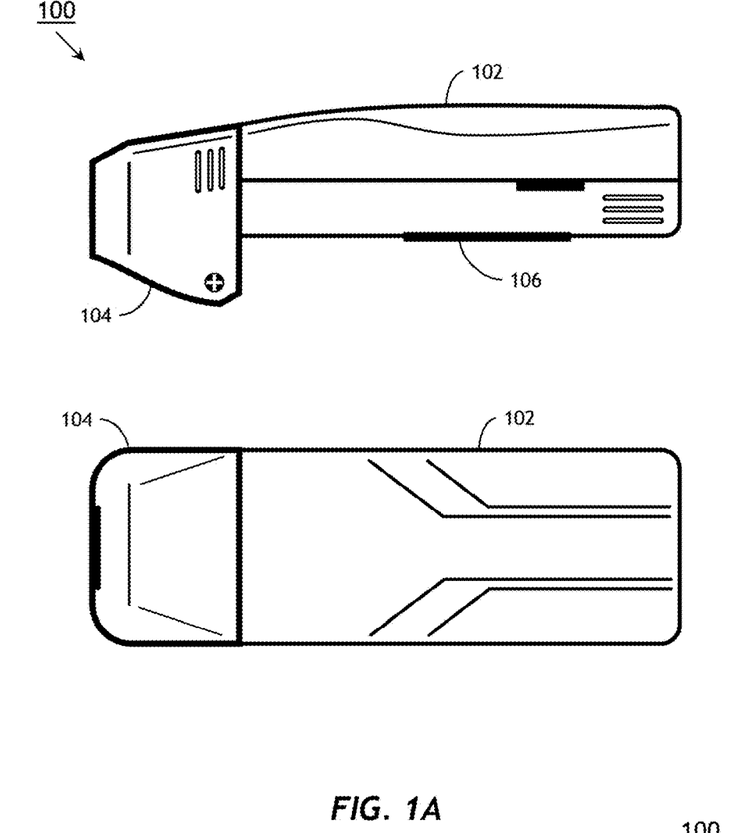
FIGS. 1A and 1B illustrate an intelligent camera system according to embodiments of the inventive concepts disclosed herein.
Figure 1B:
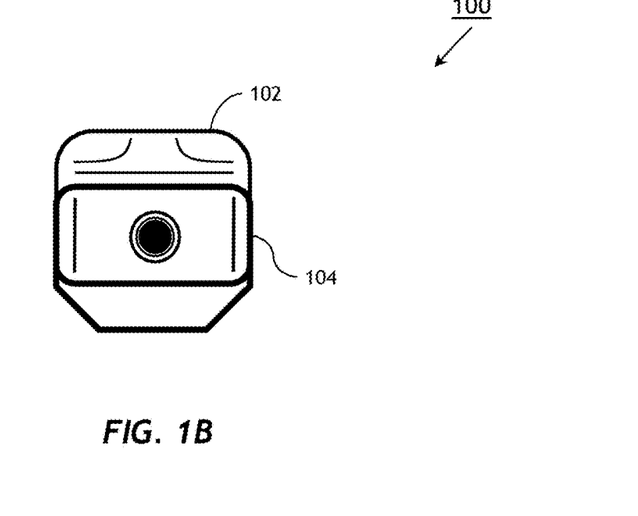

Referring to FIGS. 1A-1B, an intelligent camera system 100 may include a housing 102 within which the system 100 is partially or fully situated. In some embodiments, the housing 102 may include a lightweight yet durable shell fashioned of aluminum or ABS/polycarbonate blends. The housing 102 may incorporate one or more processors (not shown) connected to an image sensor (ex.—camera) 104 as well as a system memory (not shown) or a similar data storage unit configured for storing images captured by the image sensor 104. The system memory may include configuration scripts to be executed when the system 100 is plugged into a peripheral device (not shown), the reconfiguration scripts configured to identify, and assume control of, control subsystems of the peripheral device (e.g., the attitude control system of an unmanned aerial vehicle). The memory may include reference images associated with one or more potential subjects and used by the processor for computer vision or metadata associated with reference images (e.g., the relative sizes or positions of natural or manmade landmarks portrayed in reference images). The system 100 may incorporate a self-contained power system, i.e., one or more batteries contained within the housing 102, or the system 100 may draw power through its peripheral ports 106 from a battery or other power source of a connected peripheral device.

Figure 2A:
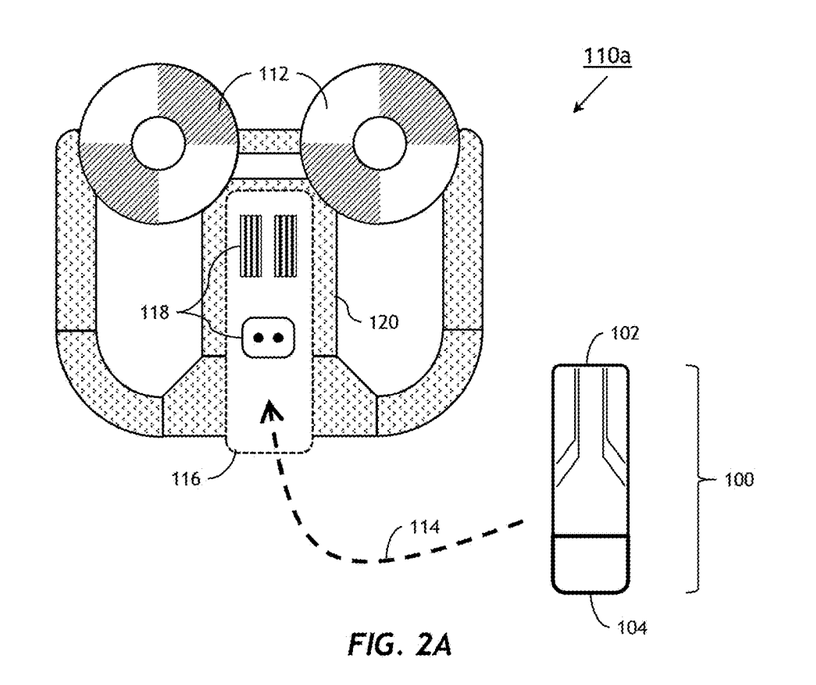
FIGS. 2A and 2B illustrate a peripheral device incorporating an intelligent camera system according to embodiments of the inventive concepts disclosed herein.
Figure 2B:
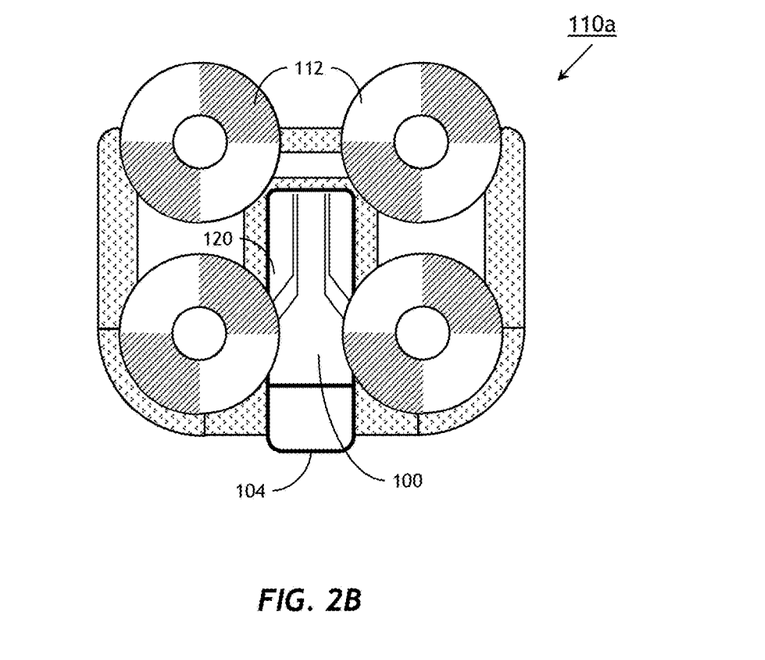

The intelligent camera system 100 may include one or more peripheral ports 106 configured to connect the system 100 physically and operatively to a peripheral device. Referring to FIGS. 2A and 2B, a peripheral device 110 compatible with the intelligent camera system 100 may include an unmanned aerial vehicle (UAV) 110a. The UAV 110a may be a quadcopter, hexacopter, octocopter, or other multi-rotor vehicle including one or more rotors 112, the rotors powered by onboard motors (not shown) to rotate at variable rotor speeds. By manipulating the various rotational speeds of the rotors 112, the control system of the UAV 110a (and, by extension, a manual or remote operator of the UAV 110a) may control the altitude, velocity, heading, or rotational orientation (ex.—pitch, yaw, roll angles) of the UAV 110a. Referring to FIG. 1A, the UAV 110a may be configured to accommodate the intelligent camera system 100. The intelligent camera system 100 may be connected to the UAV 110a by plugging (114) the housing 102 into a corresponding recession 116 of the superstructure of the UAV 110a. The recession 114 may include one or more peripheral port connectors 118 configured to accept a corresponding peripheral port 106 (not shown) of the housing 102. Once the intelligent camera system 114 has been plugged into the UAV 110a (as shown by FIG. 2B), a data link may be established via the peripheral port 106 and peripheral port connectors 118 between the system 100 and control systems mounted in a control module 120 of the UAV 110a.

Figure 3:
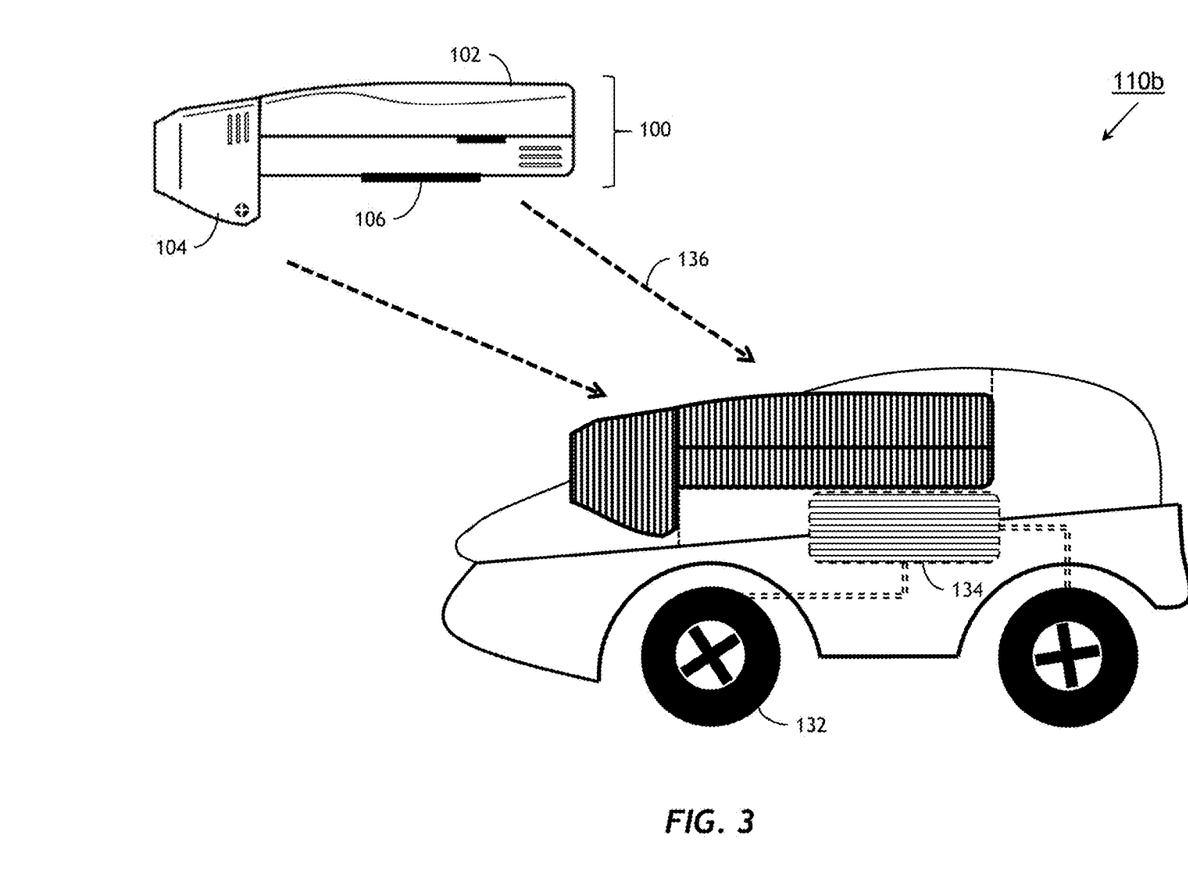
FIG. 3 illustrates a peripheral device incorporating an intelligent camera system according to embodiments of the inventive concepts disclosed herein.

Referring to FIG. 3, in some embodiments the peripheral device 110 may include an unmanned ground vehicle (UGV) 110b incorporating one or more wheels 132 and powered by an onboard motor coupled to a control system 134. The housing 102 of the intelligent camera system 100 may be plugged (136) into the UGV 110b such that the system 100 establishes a connection to the control system 134 of the UGV 110b via the peripheral port 106 of the system 100. The housing 102 of the system 100 may incorporate one or more latches, tabs, or other means (not shown) of maintaining the housing 102 in a secure and stable position relative to the peripheral device 110 (e.g., the UAV 110a or the UGV 110b) to which the system 100 is connected. For example, if the housing 102 of the system 100 is mounted to the UAV 110a or the UGV 110b in such a way that the image sensor 104 faces directly forward relative to the peripheral device 110, when the peripheral device 110 moves through space the perspective of the image sensor 104 will change in concert with the motion of the peripheral device 110.

Once the intelligent camera system 100 has been plugged into a peripheral device 110, one or more processors 138 of the system 100 may execute a series of reconfiguration scripts 138a to identify, and assume control of, the control systems 134 of the peripheral device 110. For example, if the peripheral device 110 includes a UAV 110a, the processor 138 may identify and assume control of the attitude control 134a or motor control systems of the UAV 110a which control the various rotational speeds of individual rotors 112 (not shown) of the UAV, and therefore the navigation of the UAV 110a. If the peripheral device 110 includes a UGV 110b, the processor 138 may identify and assume control of the motor control systems 134a as well as a steering control system 134b configured to control one or more axles of a wheeled UGV 110b and thus steer the UGV 110b.

In some embodiments, the intelligent camera system 100 may maneuver the peripheral device 110 through space after having assumed control of any necessary onboard control systems 134. For example, referring to FIG. 4, the processor 138 of the intelligent camera system 100 may include a visual intelligence module 138b configured to identify a subject 140 or target individual based on images (142) captured by the image sensor 104 of the system 100 and determine changes in the position, heading, or velocity of the subject 140 based on subsequent images 142 captured by the image sensor. The visual intelligence module 138b may analyze concurrent images 142 captured by the image sensor to isolate image elements corresponding to the subject 140 and to the surrounding environment (e.g., other individuals, natural features, manmade landmarks, or other known objects). The visual intelligence module 138a may analyze individual image elements to determine relationships between the subject 140 and his/her surroundings, using image metadata to determine the motion of the subject 140. The visual intelligence module 138a may compare captured images 142 to reference images known to be associated with the subject 140 to draw conclusions about the position or motion of the subject 140. The visual intelligence module 138a may incorporate pixel-based or video-based analysis of captured images 142 to identify the subject 140 therein.

Figure 4:
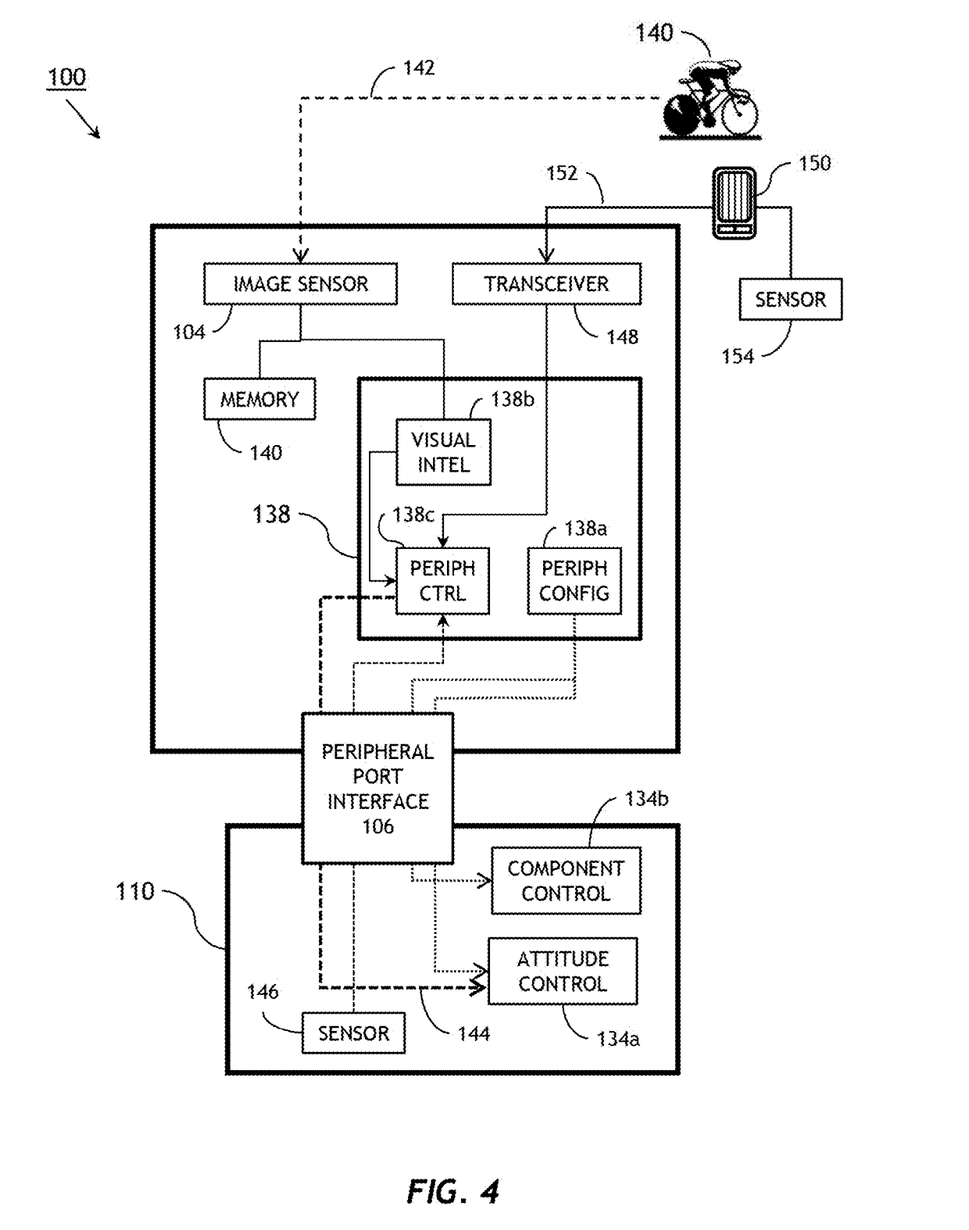
FIG. 4 is a block diagram of an intelligent camera system according to embodiments of the inventive concepts disclosed herein.

Referring to FIG. 4, the processor 138 may include a peripheral control module 138c configured to generate peripheral commands 144 based on the position, velocity, or heading of the subject 140 as determined by the visual intelligence module 138b. For example, if the visual intelligence module 138b determines from captured images 142 that the subject 140 has moved to the left relative to the frame, the peripheral control module 138c may generate a command instructing the attitude control system 134a of a UAV 110a connected to the intelligent camera system 100 to adjust the rotational speeds of the rotors 112 (not shown) of the UAV 110a such that the UAV 110 rotates slightly to the left (i.e., relative to the yaw axis of the UAV 110a), thus compensating for the movement of the subject 140 and restoring the subject 140 to a centrally framed orientation in captured images 142.

The intelligent camera system 100 may augment the visual intelligence module 138b by linking to one or more position sensors 146 mounted to the peripheral device 110, such as a GNSS (ex.—GPS) receiver, an accelerometer, a magnetometer, an inertial navigation sensor, or a compass, and configured to sense a position of the peripheral device 110. The peripheral control module 138c may account for position data of the peripheral device in assessing and tracking a relative position of the subject 140 relative to the peripheral device 110. In some embodiments, the intelligent camera system 100 may be programmed to follow a predetermined routine, directing the peripheral device 110 along a predetermined route (e.g., a racecourse) and performing minimal adjustments to the orientation of the peripheral device 110. The peripheral control module 138c may then generate and issue peripheral commands 144 to the control systems 134 of the peripheral device 110 based on the sensed position of the peripheral device 110, as reported by the position sensors 146.

In some embodiments, the intelligent camera system 100 may include a wireless transceiver 148 configured to establish a wireless link to a smartphone 150 or similar mobile communications device carried by the subject 140 on his/her person. The intelligent camera system 100 may augment the visual intelligence module 138b by collecting position data 152 associated with the subject 140 and sensed by one or more position sensors 154 of the mobile device 150 carried by the subject 140. The position sensors 154 of the mobile device 150 may sense an absolute position of the subject 140

(i.e., a GNSS receiver or other absolute position sensor) or a relative position of the subject 140 (e.g., an accelerometer, magnetometer, compass, or inertial navigation sensor). The peripheral control module 138c may incorporate position data 152 associated with the subject 140 to reduce the processing power necessary for continuous high-speed analysis of captured images 142 and respond more rapidly to changes in direction by the subject 140. Based on a series of received position data points 152 (e.g., a series of positions of the subject 140 indicating motion at a consistent velocity along a straight line), the peripheral control module 138c may interpolate a future position of the subject 140 and accordingly issue peripheral commands 144 to the control systems 134 of the peripheral device 110.

Figure 5:
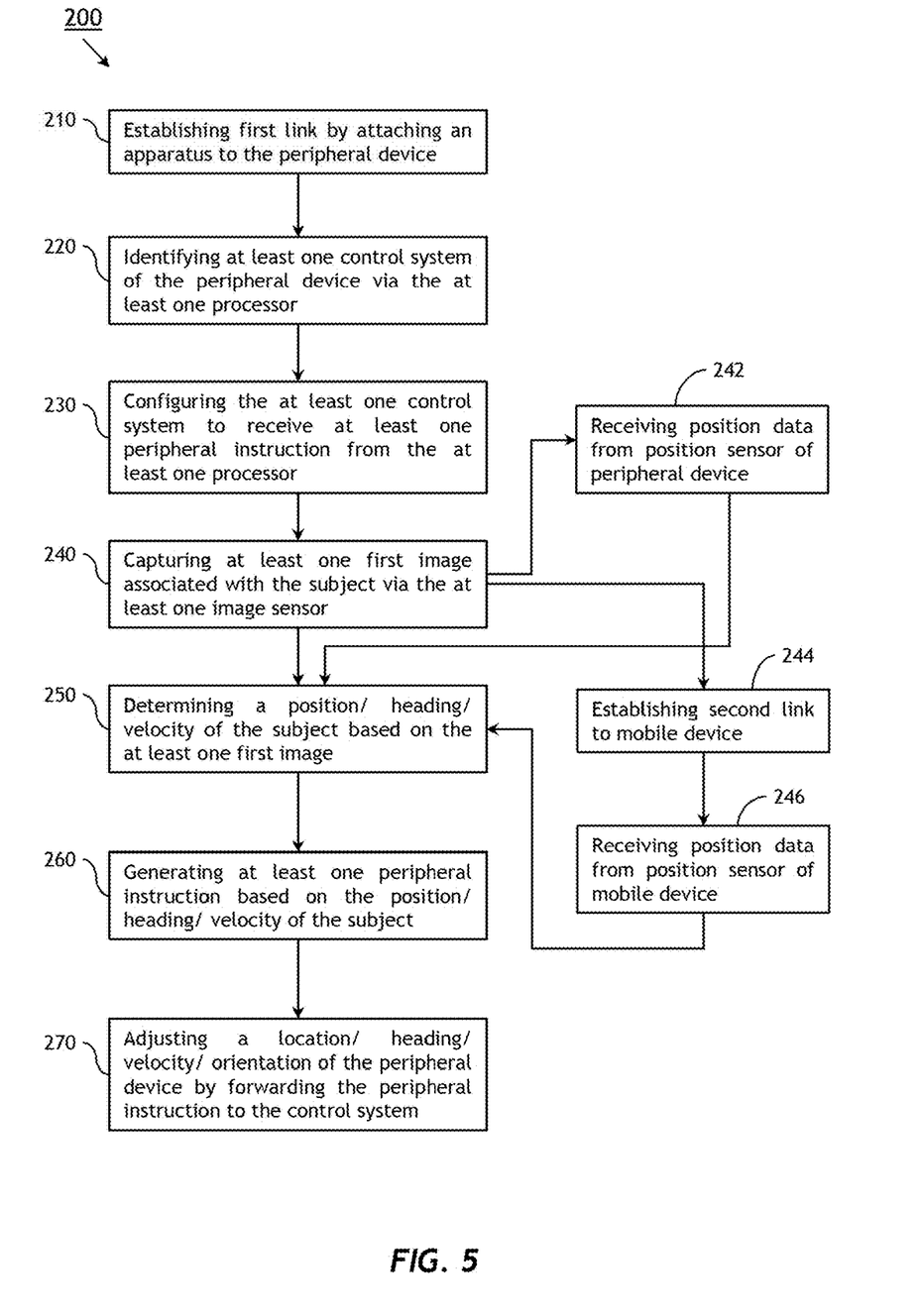
FIG. 5 is a process flow diagram illustrating a method according to embodiments of the inventive concepts disclosed herein.

Referring to FIG. 5, a flow diagram of a method 200 for tracking a subject 140 via a peripheral device 110 exemplary of one embodiment of the inventive concepts disclosed herein is shown. The method 200 may include, at a step 210, establishing a first data link by removably attaching an intelligent camera system 100 to the peripheral device 110, the system 100 including at least one image sensor 104 and a processor 138 coupled to the image sensor 104. The method 200 may, at a step 220, identify at least one control system 134 of the peripheral device 110 via the processor 138 and, at a step 230, configure the control system 134 to receive peripheral instructions 144 from the processor 138.

At a step 240, the method 200 may capture images 142 associated with the subject 140 via the image sensor 104. The method may continue at a step 250 by determining, via the processor 138, a position of the subject 140, a heading of the subject 140, or a velocity of the subject 140 based on the captured images 142. At a step 260, the method 200 may generate the peripheral instructions 144 based on the determined position, heading, or velocity of the subject 140 and, at a step 270, adjust a location, a heading, a velocity, or an orientation of the peripheral device 110 by forwarding the peripheral instructions 144 to the control systems 134 of the peripheral device 110 via the peripheral port 106.

The method 200 may include additional steps 242, 244, and 246. At a step 242, the method 200 may receive, via the processor 138, position data from a position sensor 146 of the peripheral device 110. At a step 244, the method may establish (via the processor 138 and wireless transceiver 152) a wireless link to a mobile device 150 carried by the subject 140. At a step 246, the method 200 may receive position data 152 associated with the subject 140 from position sensors 154 of the mobile device 150 carried by the subject 140.

While particular aspects of the inventive concepts disclosed herein have been shown and described, it will be apparent to those skilled in the art that, based upon the teachings herein, changes and modifications may be made without departing from the scope of the inventive concepts disclosed herein and their broader aspects and, therefore, the appended claims are to encompass within their scope all such changes and modifications as are within the broad scope of the inventive concepts disclosed herein.

We claim:

1. An intelligent camera system, comprising:
a housing connectable to a peripheral vehicle by a peripheral port;
at least one visual image sensor situated at least partially within the housing and configured to capture at least one visual image;
at least one wireless transceiver configured to:
establish a wireless link to at least one mobile communications device carried by a subject;
and
receive, via the wireless link, position data corresponding to the subject from the mobile communications device;
at least one processor coupled to the at least one visual image sensor and to the wireless transceiver, the processor configured to:
select the at least one subject based on the at least one visual image;
establish a first data link to the peripheral vehicle via the at least one peripheral port;
identify at least one control system of the peripheral vehicle via the first data link;
generate at least one peripheral instruction based on one or more of the at least one visual image and the position data;
and
adjust at least one of a location of the peripheral vehicle, a heading of the peripheral vehicle, a velocity of the peripheral vehicle, and an orientation of the peripheral vehicle by forwarding the peripheral instruction to the at least one control system via the first data link;
and
at least one memory operatively coupled to the at least one processor and configured to store the at least one visual image.

2. The intelligent camera system of claim 1, wherein:
the at least one processor is configured to select the at least one subject based on the at least one visual image and the position data.

3. The intelligent camera system of claim 2, wherein the at least one processor is further configured to:
(1) receive local position data from a position sensor of the peripheral vehicle, via the first data link;
and
(2) determine a relative position of the subject based on at least one of the at least one first visual image, the local position data, and the received position data.

4. The intelligent camera system of claim 3, wherein the at least one position sensor includes at least one of a GNSS receiver, an accelerometer, a compass, and a magnetometer.

5. The intelligent camera system of claim 1, wherein the at least one processor is configured to determine at least one of a velocity of the subject and a heading of the subject based on one or more of the at least one visual image and the position data.

6. The intelligent camera system of claim 5, wherein the at least one processor is configured to determine at least one future position of the subject based on one or more of the at least one visual image and the position data.

7. The intelligent camera system of claim 5, wherein the at least one processor is configured to determine at least one of a velocity of the subject and a heading of the subject by comparing the at least one visual image to at least one reference image associated with the subject.

8. The intelligent camera system of claim 1, wherein:
the peripheral vehicle includes an unmanned aerial vehicle (UAV) having at least one rotor configured to rotate at a rotor speed, the at least one rotor articulated by at least one motor coupled to the at least one control system; and
the peripheral instruction includes adjusting at least one of a position of the peripheral vehicle, an altitude of the peripheral vehicle, a rotational orientation of the peripheral vehicle, a heading of the peripheral vehicle, and a velocity of the peripheral vehicle by adjusting at least one rotor speed.

9. The intelligent camera system of claim 1, wherein the peripheral vehicle includes an unmanned ground vehicle.

10. A method for tracking a subject via a peripheral device, the method comprising:
   establishing a first data link by removably attaching an apparatus to the peripheral device, the apparatus including at least one visual image sensor and at least one processor coupled to the at least one visual image sensor;
   identifying at least one control system of the peripheral device via the at least one processor;
   configuring the at least one control system to receive at least one peripheral instruction from the at least one processor;
   capturing at least one first visual image via the at least one visual image sensor;
   selecting a subject to track based on the at least one first visual image;
   establishing a wireless link to at least one mobile communication device carried by the subject via a wireless transceiver of the apparatus;
   receiving position data corresponding to the subject from a position sensor of the mobile communication device via the wireless link;
   determining, via the at least one processor, at least one of a heading of the subject and a velocity of the subject based on the at least one first visual image and the received position data;
   generating at least one peripheral instruction via the at least one processor based on at least one of the visual image and the received position data;
   and
   adjusting at least one of a location of the peripheral device, a heading of the peripheral device, a velocity of the peripheral device, and an orientation of the peripheral device by forwarding the at least one peripheral instruction to the at least one control system.

11. The method of claim 10, wherein establishing a first data link by removably attaching an apparatus to the peripheral device, the apparatus including at least one image sensor and at least one processor coupled to the at least one visual image sensor, includes:
   establishing a first data link by removably attaching an apparatus to at least one of an unmanned aerial vehicle (UAV) and an unmanned ground vehicle (UGV), the apparatus including at least one visual image sensor and at least one processor coupled to the at least one visual image sensor.

12. The method of claim 11, wherein:
   establishing a first data link by removably attaching an apparatus to at least one of an unmanned aerial vehicle (UAV) and an unmanned ground vehicle (UGV), the apparatus including at least one visual image sensor and at least one processor coupled to the at least one visual image sensor, includes
   establishing a first data link by removably attaching an apparatus to at least one unmanned aerial vehicle (UAV), the at least one UAV including at least one rotor configured to rotate at a rotor speed and at least one motor coupled to, and configured to actuate, the at least one rotor, the apparatus including at least one image sensor and at least one processor coupled to the at least one image sensor;
   and
   adjusting at least one of a location of the peripheral device, a heading of the peripheral device, a velocity of the peripheral device, and an orientation of the peripheral device by forwarding the at least one peripheral instruction to the at least one control system includes adjusting at least one rotor speed by forwarding the at least one peripheral instruction to the at least one control system.

13. The method of claim 10, wherein determining, via the at least one processor, at least one of a heading of the subject and a velocity of the subject based on the at least one first visual image and the received position data includes:
   receiving, via the at least one processor, local position data from a position sensor of the peripheral device via the first data link.

14. The method of claim 13, wherein determining, via the at least one processor, at least one of a heading of the subject and a velocity of the subject based on the at least one first visual image and the received position data includes:
   determining, via the at least one processor, a relative position of the subject based on at least one of the at least one first visual image, the local position data, and the received position data.

15. The method of claim 10, wherein determining, via the at least one processor, at least one of a heading of the subject and a velocity of the subject based on the at least one first visual image and the received position data includes:
   determining, via the at least one processor, at least one of a heading of the subject and a velocity of the subject by comparing the at least one first visual image to at least one reference image associated with the subject.

16. The method of claim 10, wherein:
   determining, via the at least one processor, at least one of a heading of the subject and a velocity of the subject based on the at least one first visual image and the received position data includes determining, via the at least one processor, at least one future position of the subject based on the at least one first visual image and the received position data; and
   generating the at least one peripheral instruction via the at least one processor based on at least one of the visual image and the received position data includes generating the at least one peripheral instruction via the at least one processor based on the at least one future position of the subject.

* * * * *